US012591871B2

(12) United States Patent
Kavanaugh et al.

(10) Patent No.: US 12,591,871 B2
(45) Date of Patent: Mar. 31, 2026

(54) UNIVERSAL PAYMENT INTENT

(71) Applicant: STRIPE, INC., South San Francisco, CA (US)

(72) Inventors: Erin Kavanaugh, Newport Beach, CA (US); Olivier Roger Godement, San Francisco, CA (US); Tzuhsien Chan, San Francisco, CA (US); Amy Nguyen, Seattle, WA (US); Sophia Sakellariadis, San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 206 days.

(21) Appl. No.: 17/987,577

(22) Filed: Nov. 15, 2022

(65) Prior Publication Data

US 2023/0153774 A1 May 18, 2023

Related U.S. Application Data

(60) Provisional application No. 63/279,482, filed on Nov. 15, 2021.

(51) Int. Cl.
| | |
|---|---|
| *G06Q 20/12* | (2012.01) |
| *G06Q 20/14* | (2012.01) |
| *G06Q 20/22* | (2012.01) |
| *G06Q 30/04* | (2012.01) |
| *G06Q 30/0601* | (2023.01) |

(52) U.S. Cl.
CPC ........... *G06Q 20/12* (2013.01); *G06Q 20/227* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 11,238,418 | B2 * | 2/2022 | Tikku | G06Q 20/202 |
| 11,756,020 | B1 * | 9/2023 | Stipech | G06F 3/0486 |
| | | | | 705/41 |
| 2014/0279509 | A1 * | 9/2014 | Khilnani | G06Q 20/227 |
| | | | | 705/44 |
| 2014/0351147 | A1 * | 11/2014 | Castrechini | G06Q 20/382 |
| | | | | 705/79 |
| 2016/0180302 | A1 * | 6/2016 | Bagot, Jr. | G06Q 20/102 |
| | | | | 705/40 |
| 2017/0278085 | A1 * | 9/2017 | Anderson | G06Q 20/405 |
| 2017/0316484 | A1 * | 11/2017 | Holmes | G06Q 10/1097 |
| 2020/0279242 | A1 * | 9/2020 | Dahn | G06Q 20/12 |
| 2020/0294106 | A1 * | 9/2020 | Seshan | G06N 20/00 |
| 2021/0158420 | A1 * | 5/2021 | Canfield | G06F 16/953 |

(Continued)

FOREIGN PATENT DOCUMENTS

WO WO-2018227139 A1 * 12/2018 ......... G06Q 30/0214

*Primary Examiner* — Matthew S Gart
*Assistant Examiner* — Tony P Kanaan
(74) *Attorney, Agent, or Firm* — Foley & Lardner LLP

(57) ABSTRACT

In an example embodiment, a solution is provided that introduces a dynamic user interface that automatically identifies payment methods available for a transaction. The dynamic user interface also may optionally present the available payment methods in an ordering, as determined by a machine learning model. More particularly, a payment processing system may determine a payment intents object, with all available payment methods for a transaction and optionally an ordering for those payment methods.

20 Claims, 9 Drawing Sheets

(56) References Cited

U.S. PATENT DOCUMENTS

| | | | | |
|---|---|---|---|---|
| 2021/0256579 A1* | 8/2021 | Horesh | .................... | G06N 5/01 |
| 2021/0350382 A1* | 11/2021 | Lopes | .................... | G06Q 20/14 |
| 2023/0067073 A1* | 3/2023 | McCormick | .......... | G06Q 40/12 |

* cited by examiner

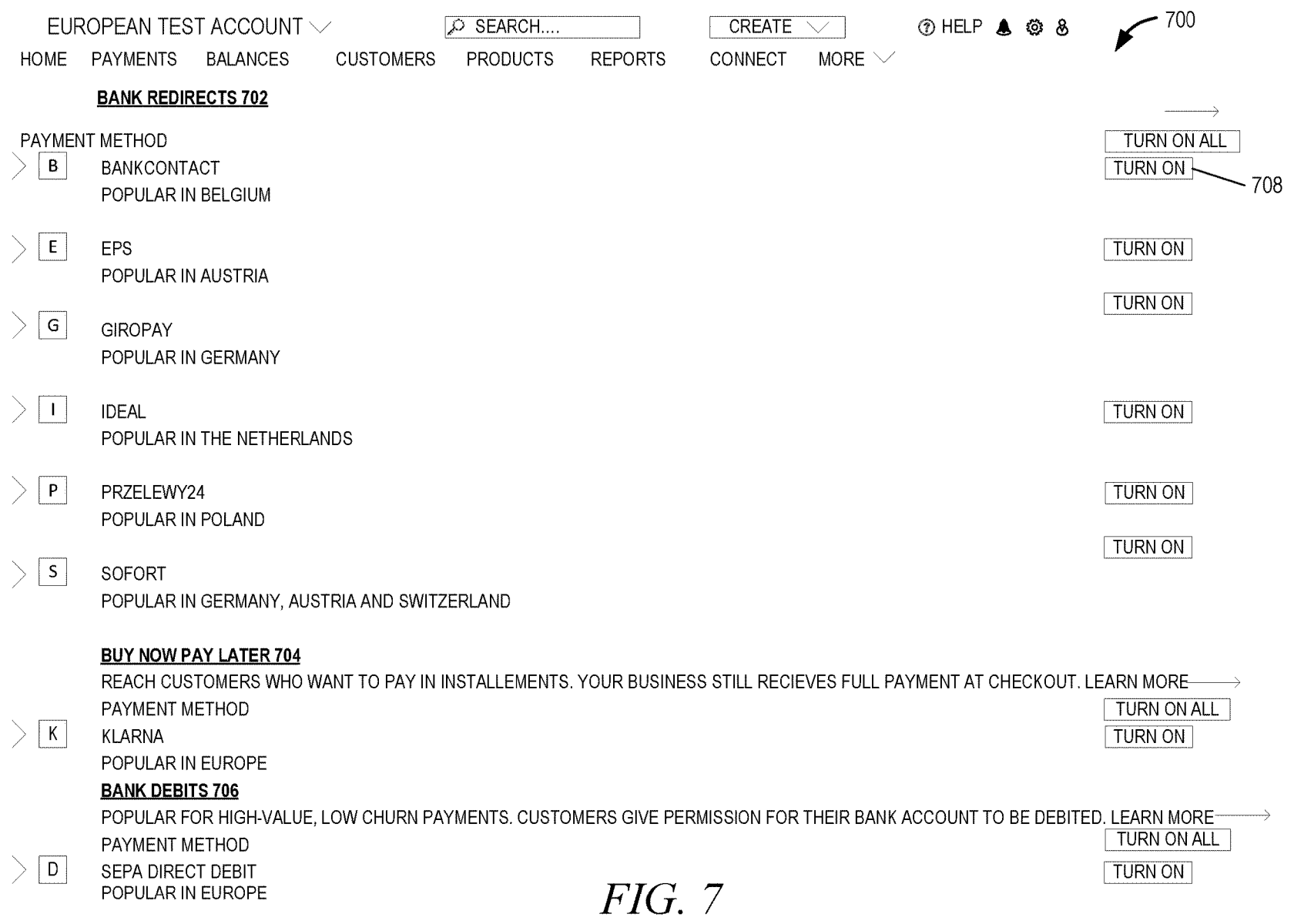

HOME   PAYMENTS   BALANCES   CUSTOMERS   PRODUCTS   REPORTS

EUROPEAN TEST ACCOUNT ∨     SEARCH.....    CREATE ∨    ⑦ HELP 🔔 ⚙ ⑧

CONNECT   MORE ∨

700

BANK REDIRECTS 702

PAYMENT METHOD

∨   B   BANKCONTACT     TURN ON ALL
     POPULAR IN BELGIUM     TURN ON   708

∨   E   EPS     TURN ON
     POPULAR IN AUSTRIA

∨   G   GIROPAY     TURN ON
     POPULAR IN GERMANY

∨   I   IDEAL     TURN ON
     POPULAR IN THE NETHERLANDS

∨   P   PRZELEWY24     TURN ON
     POPULAR IN POLAND

∨   S   SOFORT     TURN ON
     POPULAR IN GERMANY, AUSTRIA AND SWITZERLAND

BUY NOW PAY LATER 704

REACH CUSTOMERS WHO WANT TO PAY IN INSTALLEMENTS. YOUR BUSINESS STILL RECIEVES FULL PAYMENT AT CHECKOUT. LEARN MORE →

PAYMENT METHOD     TURN ON ALL

∨   K   KLARNA     TURN ON
     POPULAR IN EUROPE

BANK DEBITS 706

POPULAR FOR HIGH-VALUE, LOW CHURN PAYMENTS. CUSTOMERS GIVE PERMISSION FOR THEIR BANK ACCOUNT TO BE DEBITED. LEARN MORE →

PAYMENT METHOD     TURN ON ALL

∨   D   SEPA DIRECT DEBIT     TURN ON
     POPULAR IN EUROPE

*FIG. 7*

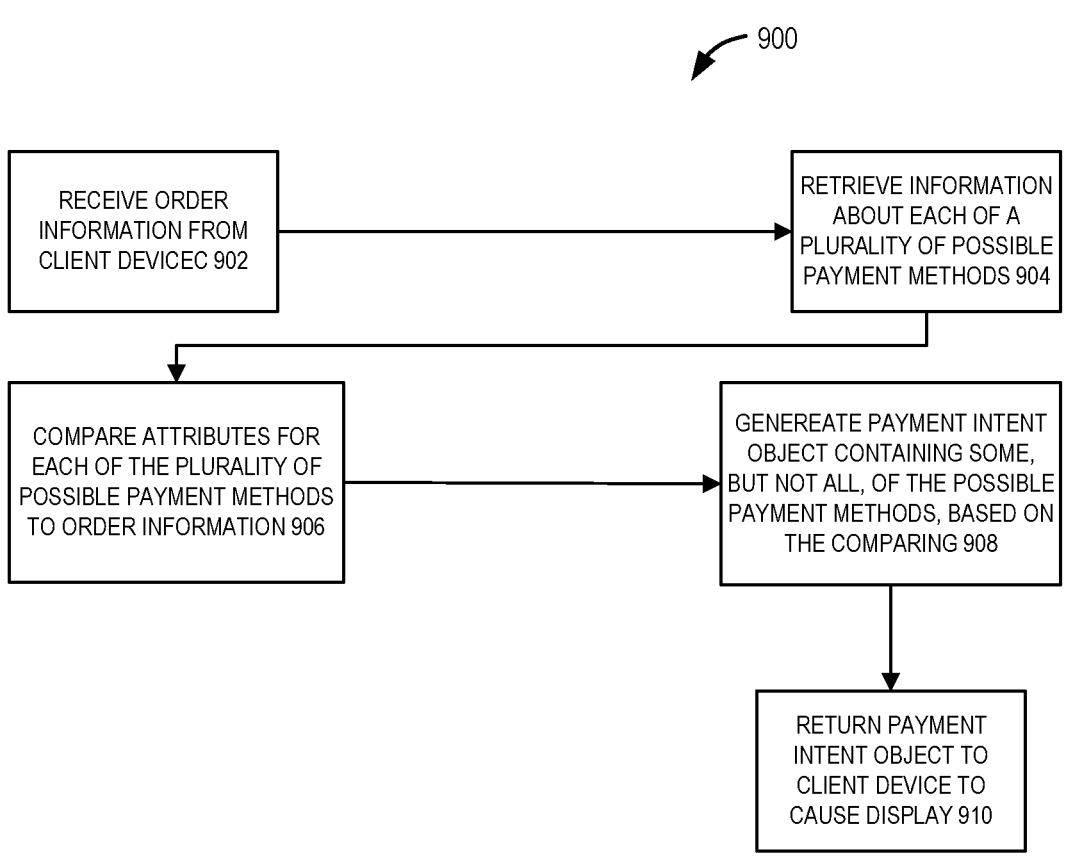

RECEIVE ORDER INFORMATION FROM CLIENT DEVICEC 902

RETRIEVE INFORMATION ABOUT EACH OF A PLURALITY OF POSSIBLE PAYMENT METHODS 904

COMPARE ATTRIBUTES FOR EACH OF THE PLURALITY OF POSSIBLE PAYMENT METHODS TO ORDER INFORMATION 906

GENEREATE PAYMENT INTENT OBJECT CONTAINING SOME, BUT NOT ALL, OF THE POSSIBLE PAYMENT METHODS, BASED ON THE COMPARING 908

RETURN PAYMENT INTENT OBJECT TO CLIENT DEVICE TO CAUSE DISPLAY 910

UNIVERSAL PAYMENT INTENT

CROSS-REFERENCE TO RELATED APPLICATIONS

This application claims the benefit of U.S. Provisional Application No. 63/279,482, filed Nov. 15, 2021, entitled "UNIVERSAL PAYMENT INTENT," which is incorporated herein by reference in its entirety.

TECHNICAL FIELD

The subject matter disclosed herein generally relates to user interfaces on a computer system. More particularly, the subject matter disclosed herein relates to a user interface for payment methods that determines universal payment intent.

BACKGROUND

Modernly, it is common for the Internet to be used for financial transactions, such as purchasing an item from an online retailer, subscribing to a service, etc. This is typically performed via a user interface presented to the person sending payment, such as the purchaser. This user interface may be displayed, for example, in a web browser on a desktop, laptop, or mobile computing device, or alternatively may be displayed within a dedicated application ("app") on such a device.

Often a user will be presented with a choice of multiple different payment methods (e.g., credit card, bank draft, cryptocurrency, etc.) in such a user interface. The available payment methods displayed, however, must be manually set by the merchant. For example, a merchant may indicate that they accept credit cards (e.g., Visa™, Mastercard™, American Express™, etc.), online payment systems (e.g., Pay-Pal™), online banking transfers (e.g., Zelle™), and Automated Clearing House (ACH) transactions. It isn't always clear, however, which payment methods would be appropriate for the merchant to select from. For example, certain payment methods do not work in certain countries, and other payment methods may only be useful for certain types of products and/or transaction.

BRIEF DESCRIPTION OF THE DRAWINGS

Some embodiments are illustrated by way of example and not limitation in the figures of the accompanying drawings.

FIG. 7 is a screen capture illustrating a user interface where a merchant may enable and disable different payment methods, in accordance with an example embodiment.

FIG. 9 is a flow diagram illustrating a method, in accordance with an example embodiment.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a solution is provided that introduces a dynamic user interface that automatically identifies payment methods available for a merchant.

Figure 1:
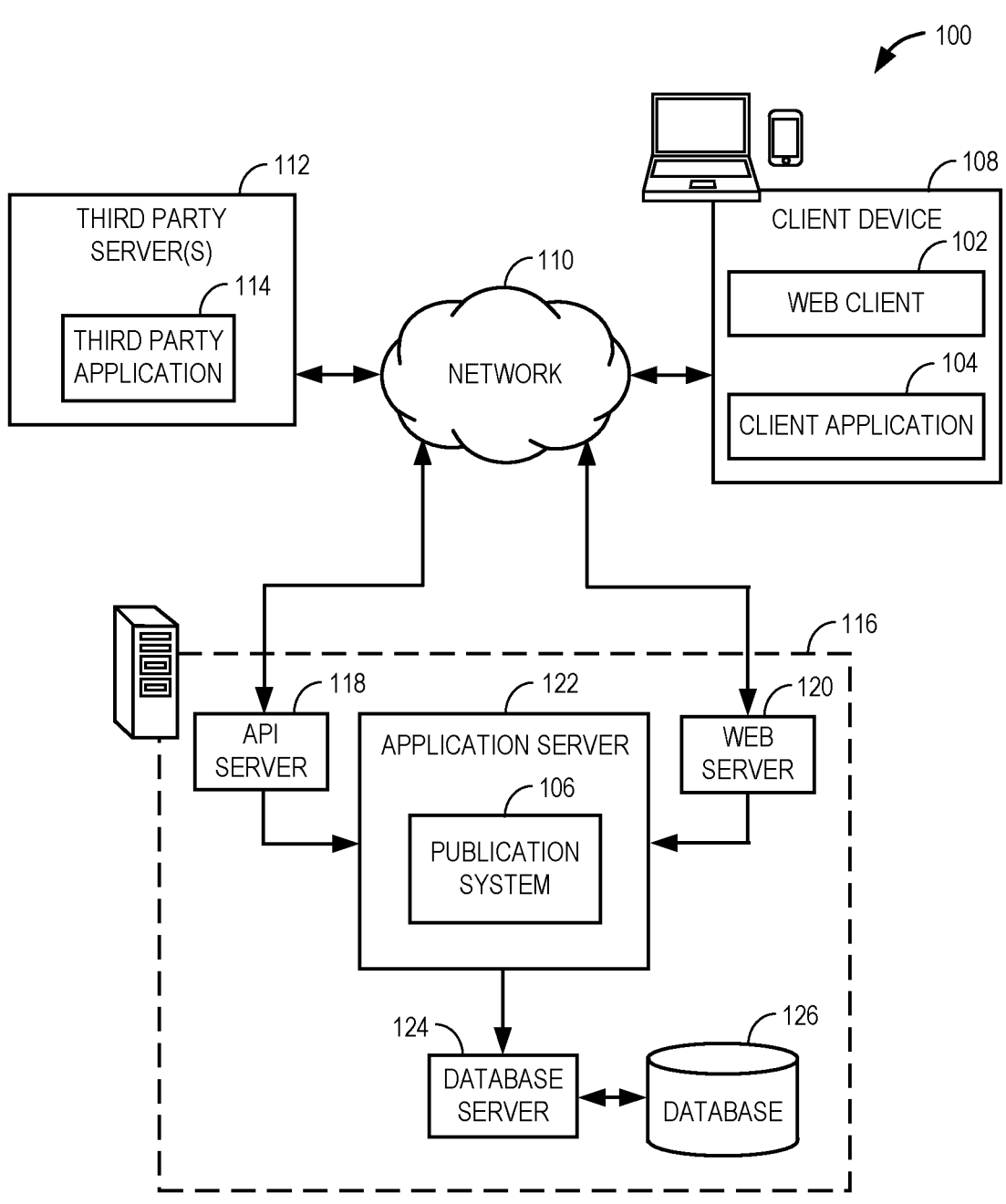
With reference to FIG. 1, an example embodiment of a high-level SaaS network architecture is shown.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
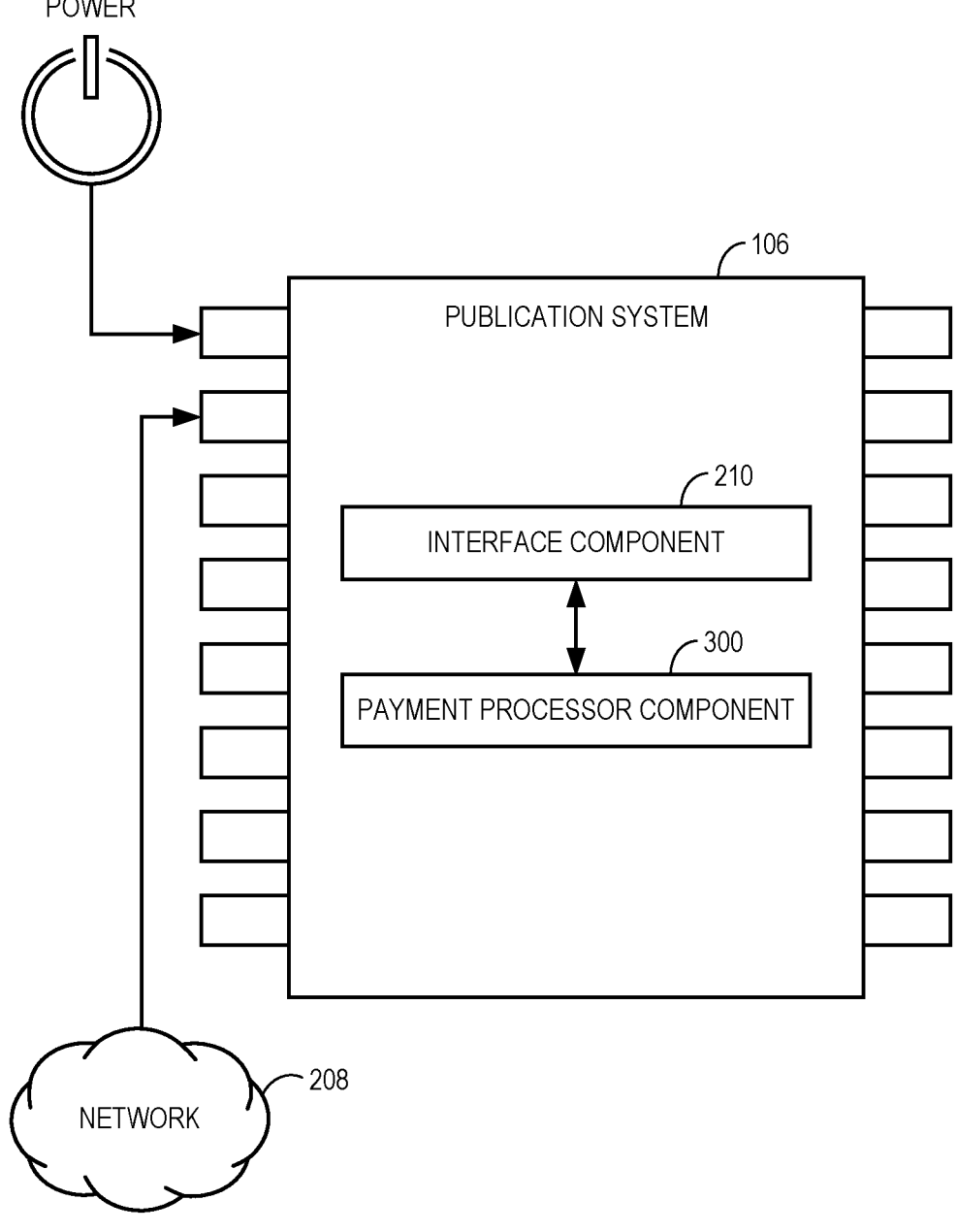
FIG. 2 is a block diagram showing architectural details of a publication system, according to some example embodiments.

FIG. 2 is a block diagram showing architectural details of the publication system 106, according to some example embodiments. Specifically, the publication system 106 is shown to include an interface component 210 by which the publication system 106 communicates (e.g., over a network 208) with other systems within the SaaS network architecture 100.

The interface component 210 is communicatively coupled to a payment processor component 300 that operates to provide payment processing functions for a payment processor in accordance with the methods described herein with reference to the accompanying drawings. Payment processor component 300 processes payment made via the publication system 106, and in some example embodiments, processes payments by causing display of a subset of all available payment methods to a user during checkout. The publication system 106 is a system that publishes information over the Internet, such as using a web server or application server. In an example embodiment, the publication system 106 is hosted at https://stripe.com by Stripe. Interface component 210 provides interfaces for communications to and from the publication system 106, as well as among components within the publication system 106.

Figure 3:
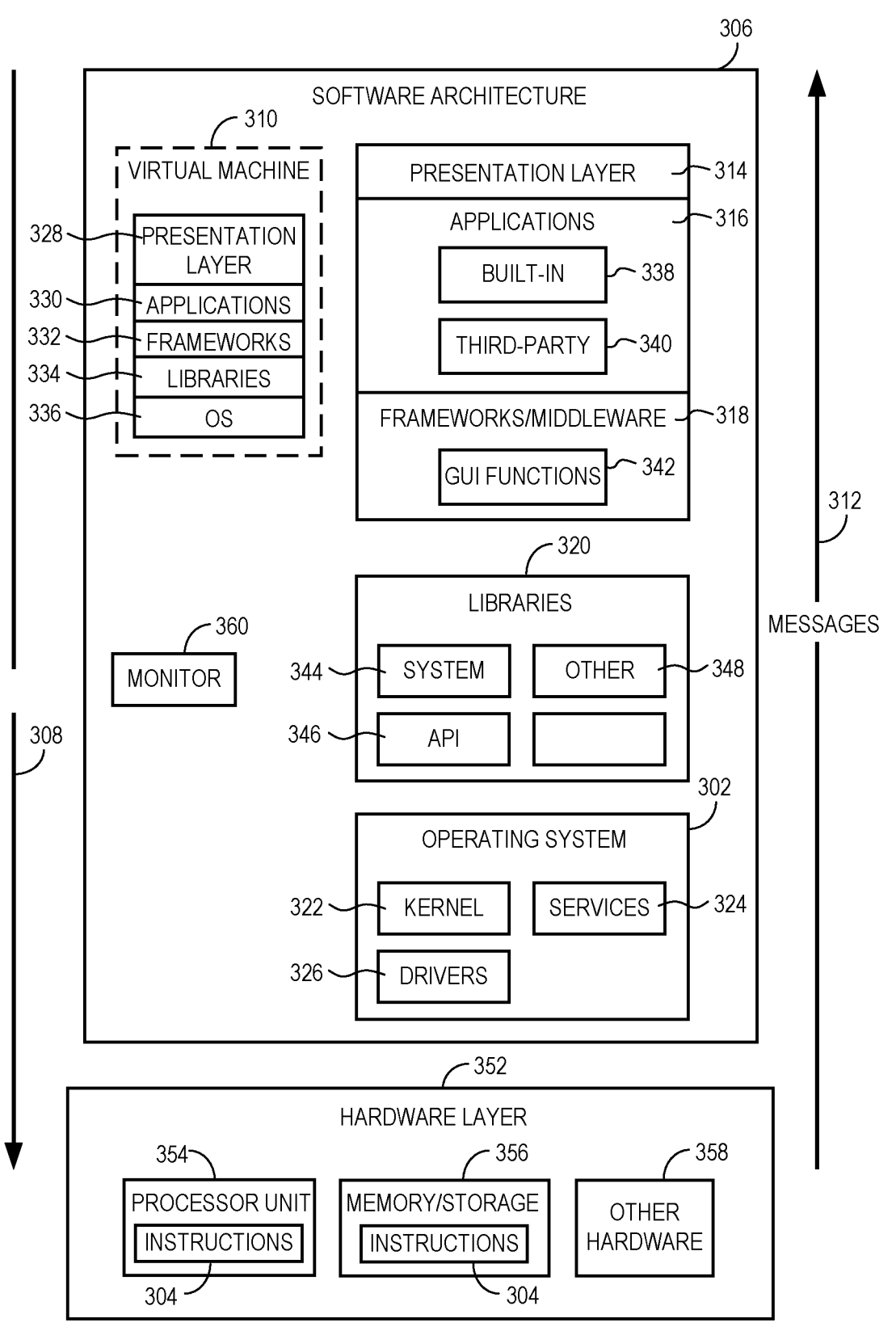
FIG. 3 is a block diagram illustrating an example software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
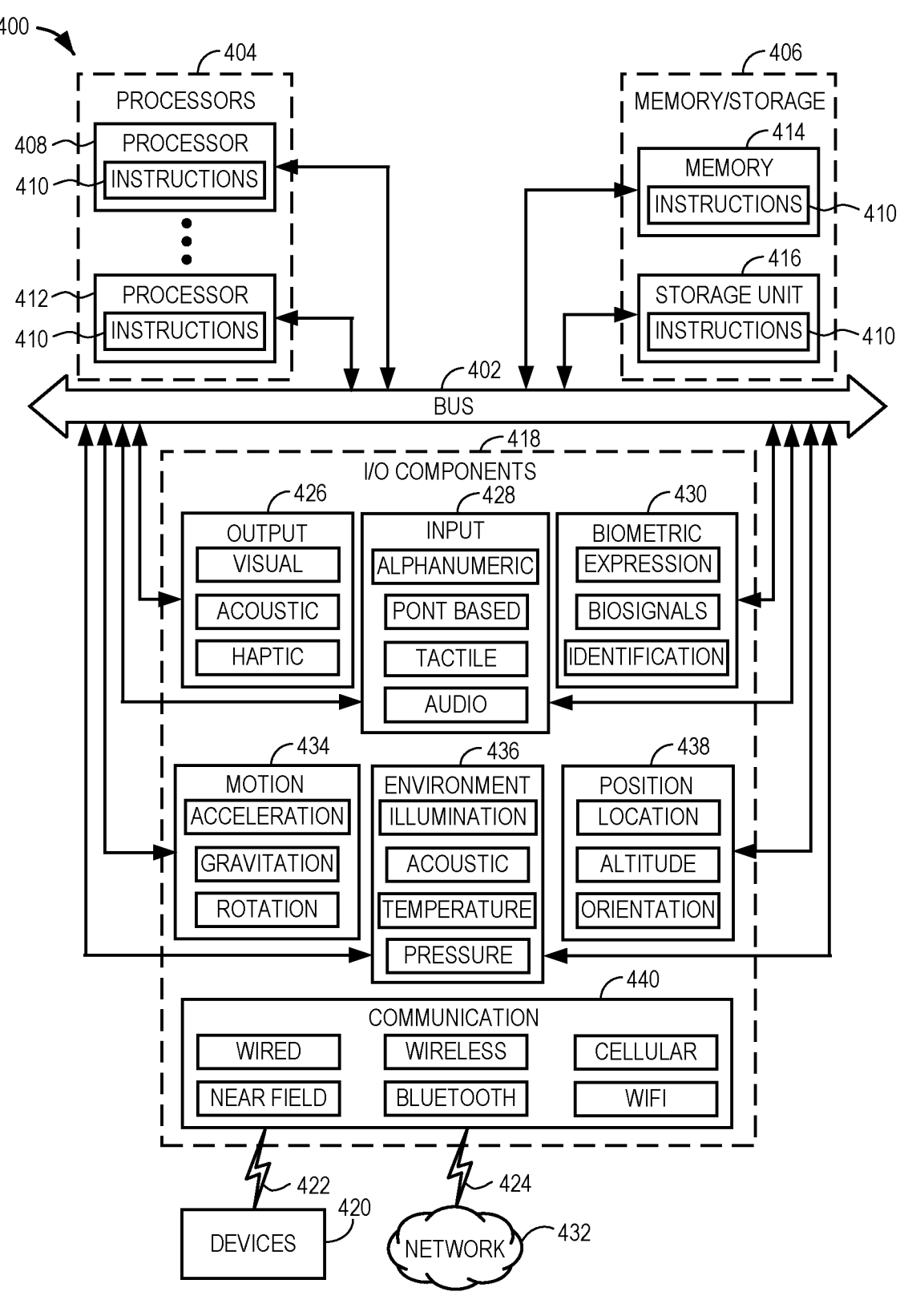
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components

434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In an example embodiment, a payment intent object is used to represent a merchant's intent to collect payment from a customer, tracking charge attempts and payment state changes throughout the process. The payment methods shown to customers during the checkout process are included in the payment intent object. In an example embodiment, the currency passed in the payment intent object filters the payment methods that the customer sees. For example, if Euro is passed on the payment intent object, and the OXXO payment method does not support Euro payments, then the customer will not see the OXXO payment method.

In an example embodiment, in addition to the currency, payment method restrictions (e.g., country restrictions) and other parameters are used to determine the list of supported payment methods. Payment methods that increase conversion and are most relevant to the currency and customer location are prioritized, whereas lower priority payment methods may be hidden behind an overflow menu.

More particularly, a data structure such as a table is used to store information about each potential payment method and appropriate attributes of a merchant, product, transaction, and customer for each potential payment method. Some payment methods are available for all variations of merchant, product, transaction, reusability (ability to make future transactions, i.e., the opposite of one-side payments), availability of delayed authorizations, and customer, while other payment methods may have some restrictions, such as location restrictions, amount restrictions, product type restrictions, etc. All the restrictions may be stored in the table, which are accessed via a rule-based method to determine, at runtime, the appropriate payment methods.

Figure 5:
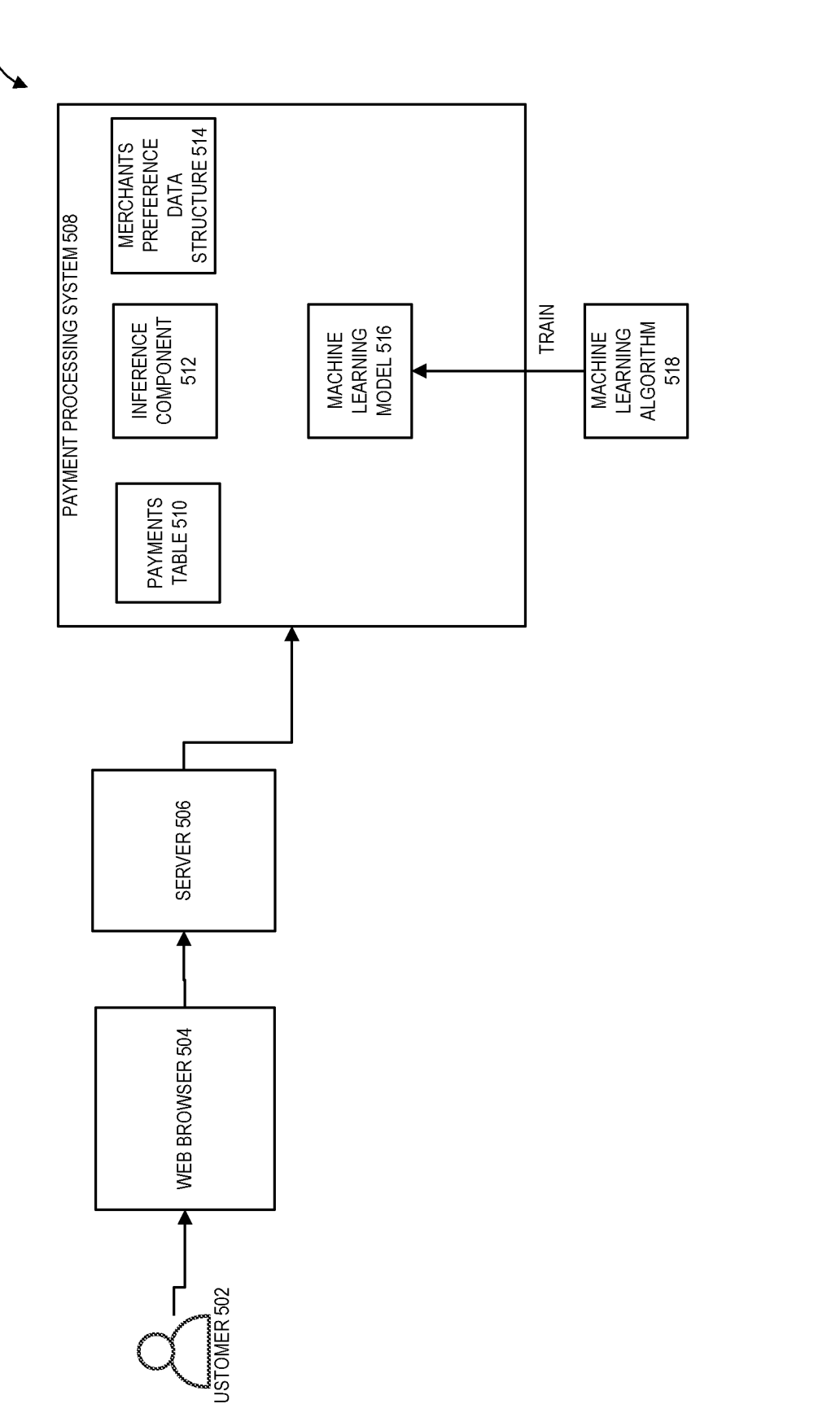
FIG. 5 is a block diagram illustrating a system, in accordance with an example embodiment.

FIG. 5 is a block diagram illustrating a system 500, in accordance with an example embodiment. Here, a customer 502, such as a customer, attempts to make an order on a web browser 504 or another client application, such as a dedicated shopping application. The web browser 504 sends the order information to a server 506, such as a merchant server. In an example embodiment, the process of the web browser 504 sending the order information to the server 506 is initiated when the user indicates they wish to complete a transaction in the web browser 504, and at a stage where the web browser 504 would want to bring up a payment page, which is a page that, for example, may contain an area for the user to select a payment method. This payment page may include, or may follow an earlier page that included, a summary of the order.

The server 506 then requests a payment intent object from payment processing system 508. Payment processing system 508 then determines which payment methods to be presented on the payment page, and the ordering in which they will be presented. These decisions may be based on a number of factors. Firstly, a payments table 510, as described above, is used to store information about each potential payment method and appropriate attributes of a merchant, product, transaction, and customer for each potential payment methods. The server 506 may utilize this payments table 510 and compare its contents to the order information, to determine whether any attributes that would necessitate eliminating a potential payment method from consideration are present in the order information. It should further be noted that in some example embodiment, the server 506 can further include an inference component 512 that makes one or more inferences about the merchant, product, transaction, or customer, from the order information, to aid in this comparison. For example, the customer may not have entered a billing or shipping address at this point in the process, and thus the server may ordinarily have difficulty determining a location of the customer, which may be relevant as some payment methods restrict their use based on geographic location (e.g., will not process payments for customers who are outside of Europe). The inference component 512 can infer the customer's location using information that is in the order information, such as customer Internet Protocol (IP) address and browser language.

Secondly, a merchants preference data structure 514 of merchant preferences may optionally also be stored and used. These merchant preferences may include, for example, indications that the merchant does not want to accept certain payment methods, for example if certain ones are too expensive for the merchant or the merchant has personal reasons for not liking the payment methods. This information may be entered by the merchant in a user interface presented to the merchant, as depicted and described below in FIG. 7. If, for example, a merchant preference is to not use a particular payment method, that particular payment method may be eliminated from consideration regardless of the comparison between the appropriate attributes of the merchant, product, transaction, and customer for the payment methods and the order information.

Thirdly, a machine learning model 516 may further eliminate from consideration and may optionally also determine an ordering for the remaining payment methods.

The machine learning model 516 may be trained by passing training data to a machine learning algorithm 518. The machine learning algorithm 518 may iterate among various parameters, changing parameters (weights) multiplied by various input variables and evaluating a loss function at each iteration, until the loss function is minimized, at which stage the parameters for that stage are learned.

The training data may include, for example, past transaction information, including location, customer, merchant, transaction, and payment method information. The payment method information may essentially act as the labels for the past transaction information, as it informs the machine learning algorithm 518 of which payment methods were selected by customers and under which contexts. The machine learning model 516 is then trained to predict an optimum payment method for any input context at runtime, and may also predict an ordering for a plurality of payment methods. The ordering may place, for example, the payment method the customer is most likely to select at the top, and the payment method the customer is next most likely to select in the next place in the ordering, and so on.

During training, the weights being changed and evaluated may be multiplied by the input variables of the training data as part of a weighted sum operation, and the weighted sum operation is used by the loss function. The same weighted sum operation can be used at evaluation-time to determine an ordering of possible payment methods for a particular transaction (based on the order information).

The machine learning algorithm 518 may be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In some example embodiments, the machine learning model 516 may be retrained at a later time, based on, for example, real-world feedback or usage information. For example, while in an earlier version of the machine learning model 516, payment method A is at the top of the ordering and payment method B is at the bottom of the ordering, if enough users in enough contexts begin selecting on payment method B rather than payment method A (even though it is presented lower on the screen), then this information can be used to retrain the machine learning model 516 to determine in what contexts payment method B should now be at the top of the ordering rather than the bottom.

Once the server 506 has determined the payment methods to permit the customer to choose from, and optionally the ordering in which these payment methods will be presented to the customer, the payment processing system 508 includes the payments methods the customer can choose from and optionally the ordering in a payment intents object, which it returns to the server 506. It is then returned to the web browser 504, where it is used to render the payments page to the customer. The customer can then select from one of the payment methods and provide billing details to finalize the payment.

Figure 6:
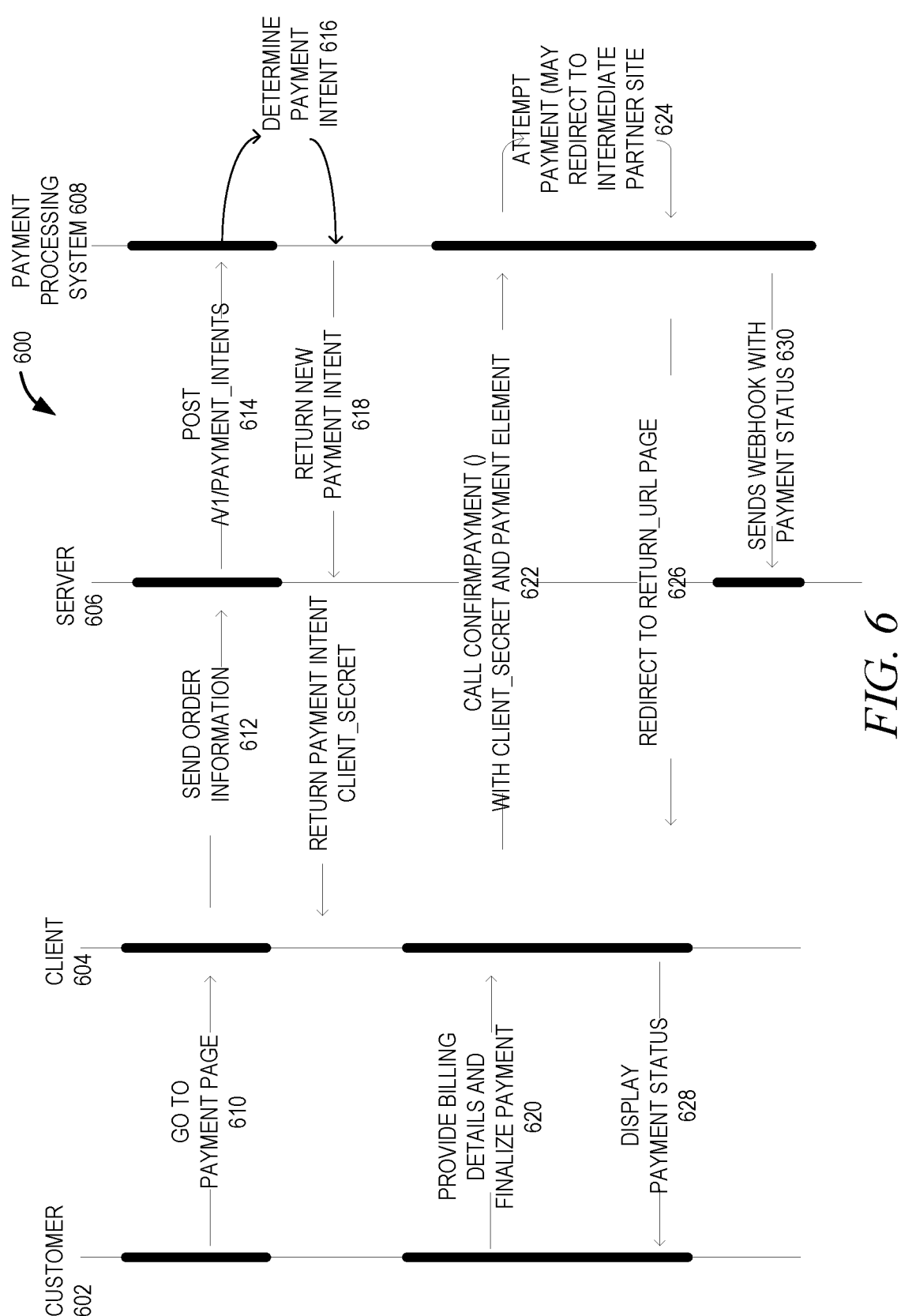
FIG. 6 is a ladder diagram illustrating a method for using a payment intent object, in accordance with an example embodiment.

FIG. 6 is a ladder diagram illustrating a method 600 for using a payment intent object, in accordance with an example embodiment. The method 600 utilizes customer 602, client 604, server 606, and payment processing system 608. At operation 610, the customer 602 navigates to a payment page. At operation 612, the client 604 sends order information about an order corresponding to the payments page to the server 606. At operation 614, the server 606 then issues a POST command to the payment processing system 608 including a version number and a request for payment intents.

At operation 616, the payment processing system 608 determines the payment intents for the transaction (and optionally the ordering thereof). At operation 618, the payment processing system 608 returns the payment intents (and optionally the ordering) to the server 606, which then returns it, along with a client secret (which will be described in more detail below) to the client 604. This is used by the client 604 to update the web page presented to the customer 602 at operation 618.

At operation 620, the customer 602 provides billing details and finalizes the payment (including a selection of a payment method). At operation 622, the client makes a direct call to the payment processing system 608 with the client secret and the selected payment element. At operation 624, the payment processing system 608 attempt to process the payment, and sends a return uniform resource locator (URL) to the client 604 with the results of that attempt at operation 626. At operation 628, the client 604 displays the payment status to the customer 602. At operation 630, the payment processing system 608 sends a webhook with payment status to the server 606.

In an example embodiment, the merchant creates a payment intent object on their server with the amount, currency, and application program interface (API) version set to include automatic payment methods. With automatic payment methods enabled, the payment intent object is created using the payment methods configured in a merchant dashboard, with inappropriate payment methods filtered out. The pseudocode for this is as follows:

```
curl https://api.stripe.com/vl/payment intents\
    -u sk_test_4eC39HqLyjWDarjtT1zdp7dc:\
    -H    "Stripe-Version:    2020    Aug.    27;
        automatic_payment_methods_beta=v1"\
    -X "POST"\
    -d "amount"=1099\
    -d "currency"="eur"
    -d "automatic_payment_methods [enabled]"=true\
```

Included in the returned payment intent object is a client secret, which the client-side uses to securely complete the payment process instead of passing the entire payment intent object. Different methods may be used to pass the client secret to the client side. For a single page application, the client secret may be retrieved from an endpoint on the server using the browser's fetch function on the client side. This approach is generally most suitable when the client side is a single-page application, particularly one built with a modern frontend framework such as React. The following is an example of how to create the server endpoint that serves the client secret:

```
1    (async ( ) => {
2        const response = await fetch('/secret');
3        const {client_secret: clientSecret} = await response.json( );
4        // Render the Payment Element using the clientSecret
5    }) ( );
1    get '/secret' do
2        intent = # ... Create or retrieve the PaymentIntent
3        {client_secret: intent.client_secret}.to_json
4    end
```

The following is for server-side rendering:

```
1    get '/checkout' do
2        @intent = # ... Fetch or create the PaymentIntent
3        erb :checkout
4    end
1    <form id="payment-form" data-secret:"<%= @intent.client_secret
     %>">
2        <div id="payment-element">
3            <!-- Elements will create form elements here -->
4        </div>
5
6        <button id="submit">Submit</button>
7    </form>
main.rb
```

Collecting payment may be performed with the payment element. The payment element is a prebuilt UI component that simplifies collecting payment details for a variety of payment methods. The payment element contains an iframe that securely sends the payment information over an HTTPs connection.

The payment element is then placed on the merchant's payment page by creating an empty Document Object Model (DOM) node (container) with a unique ID in the payment form, as follows:

```
    checkout.html
    <form id="payment-form">
        <div id="payment-element">
            <!-- Elements will create form elements here -->
        </div>
        <button id="submit">Submit</button>
        <div id="error-message">
            <!-- Display error message to your customers here -->
        </div>
    </form>
```

When the form above has loaded, an instance of the payment element may be created and mounted to the container DOM node. The client secret from earlier is passed into the options when the elements instance is created.

```
    checkout.js
    const options = {
        clientSecret: ' '
        // Fully customizable with appearance API.
```

-continued

```
        appearance: {/*...*/},
    };
```

```
    //Set up Stripe.js and Elements to use in checkout form,
        passing the client secret obt
    const elements=stripe.elements(options);
    //Create and mount the Payment Element
    const paymentElement=elements.create('payment');
    paymentElement.mount('#payment-element');
```

The payment element renders a dynamic form that allows the customer to pick a payment method. The form automatically collects all necessary payments details for the payment method selected by the customer.

FIG. 7 is a screen capture illustrating a user interface 700 where a merchant may enable and disable different payment methods, in accordance with an example embodiment. The payment methods are divided into different categories, including bank redirects 702, buy now pay later 704, and bank debits 706. The merchant can turn on or off individual payment methods or complete categories using various user interface elements, such as button 708. Turning on a payment method (or category of payment methods) expresses the merchant's desire to include the corresponding payment method(s) as available payment methods, while turning off a payment method (or category of payment methods) expresses the merchant's desire to not include the corresponding payment method(s) as available payment methods.

Figure 8:
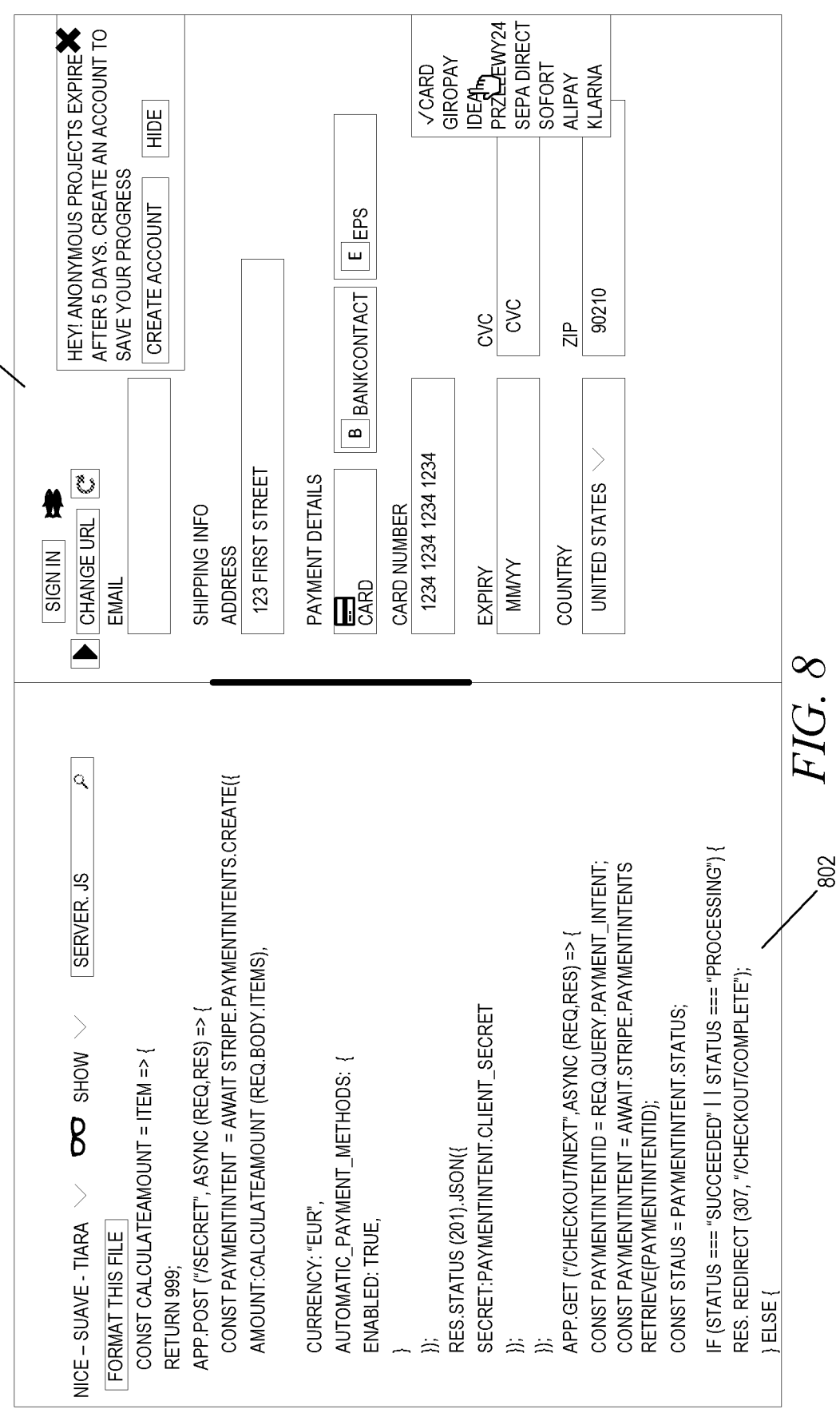
FIG. 8 is a screen capture illustrating a user interface, where a merchant may make more specific changes to the user interface displayed to a customer, by directly editing the script.

FIG. 8 is a screen capture illustrating a user interface 800, where a merchant may make more specific changes to the user interface displayed to a customer, by directly editing the script 802. Here, script 802 may be used in rendering the user interface 800 to the customer. More particularly, the script makes a call to request a payment intent. This payment intent includes the list of available payment methods as determined by a payment processing system, for a particular transaction. Essentially, use of this script 802 allows for a dynamic determination of which payment methods to display to a user, based on whatever functionality that the payment processing system has used to determine a list of available payment methods. As described elsewhere in this disclosure, this may include the payment processing system using one or more machine learning models to determine this list, based on certain criteria (e.g., location, merchant, etc.).

FIG. 9 is a flow diagram illustrating a method 900, in accordance with an example embodiment. At operation 902, order information is received from a client device. The order information pertains to an order that has not yet been submitted for payment processing, the order information generated on a payment page of a graphical user interface. At operation 904, information about each of a plurality of possible payment methods is retrieved, from a payment method data structure. The information includes one or more attributes, of a transaction, that are suitable for the corresponding possible payment method. At operation 906, the attributes for each of the possible payment methods are compared to the order information. At operation 908, based on the comparing, a payment intent object is generated containing some, but not all, of the possible payment methods. At operation 910, the payment intent object is returned to the client device to cause display of some, but not all, of the possible payment methods on the payments page of the graphical user interface.

Described implementations of the subject matter can include one or more features, alone or in combination as illustrated below by way of example.

Example 1. A system comprising:

at least one hardware processor; and a non-transitory computer-readable medium storing instructions that, when executed by the at least one hardware processor, cause the at least one hardware processor to perform operations comprising:

receiving order information from a client device, the order information pertaining to an order that has not yet been submitted for payment processing, the order information generated on a payment page of a graphical user interface;

retrieving, from a payment method data structure, information about each of a plurality of possible payment methods, the information including one or more attributes, of a transaction, that are suitable for a corresponding possible payment method;

retrieving, from a merchants preferences table, one or more payment method preferences of a merchant identified in the order information;

comparing the one or more attributes for each of the possible payment methods to the order information;

based on the comparing, and based on the one or more payment method preferences, generating a payment intent object containing some, but not all, of the plurality of possible payment methods; and returning the payment intent object to the client device to cause display of the possible payment methods in the payment intent object on the payments page of the graphical user interface.

Example 2. The system of Example 1, wherein the one or more attributes each pertain to a location, merchant, product, transaction, or customer.

Example 3. The system of Example 1 or 2, wherein the order information includes a location of a customer and the one or more attributes includes an indication that at least one of the plurality of possible payment methods does not process transactions in a currency associated with the location.

Example 4. The system of any of Examples 1-3, wherein the causing display includes returning, to the client device, an instance of the payment intent object with some of the possible payment methods removed.

Example 5. The system of Example 4, wherein the payment intent object further includes a client secret.

Example 6. The system of any of Examples 1-6, wherein payment via one of the displayed possible payment methods is performed using a payment element containing an iframe that securely sends payment information over a secure Hypertext Transfer Protocol (HTTPs) connection.

Example 7. The system of Example 8, wherein the payment element renders a dynamic form that allows a customer to pick a payment method from the displayed possible payment methods.

Example 8. A method comprising:

receiving order information from a client device, the order information pertaining to an order that has not yet been submitted for payment processing, the order information generated on a payment page of a graphical user interface;

retrieving, from a payment method data structure, information about each of a plurality of possible payment methods, the information including one or more attributes, of a transaction, that are suitable for a corresponding possible payment method;

retrieving, from a merchants preferences table, one or more payment method preferences of a merchant identified in the order information;

comparing the one or more attributes for each of the possible payment methods to the order information;

based on the comparing, and based on the one or more payment method preferences, generating a payment intent object containing some, but not all, of the plurality of possible payment methods; and returning the payment intent object to the client device to cause display of the possible payment methods in the payment intent object on the payments page of the graphical user interface.

Example 9. The method of Example 8, wherein the one or more attributes each pertain to a location, merchant, product, transaction, or customer.

Example 10. The method of Example 8 or 9, wherein the order information includes a location of a customer and the one or more attributes includes an indication that at least one of the plurality of possible payment methods does not process transactions in a currency associated with the location.

Example 11. The method of any of Examples 8-10, wherein the causing display includes returning, to the client device, an instance of the payment intent object with some of the possible payment methods removed.

Example 12. The method of Example 11, wherein the payment intent object further includes a client secret.

Example 13. The method of any of Examples 8-12, wherein payment via one of the displayed possible payment methods is performed using a payment element containing an iframe that securely sends payment information over a secure Hypertext Transfer Protocol (HTTPs) connection.

Example 14. The method of Example 13, wherein the payment element renders a dynamic form that allows a customer to pick a payment method from the displayed possible payment methods.

Example 15. A non-transitory machine-readable medium storing instructions which, when executed by one or more processors, cause the one or more processors to perform operations comprising:

receiving order information from a client device, the order information pertaining to an order that has not yet been submitted for payment processing, the order information generated on a payment page of a graphical user interface;

retrieving, from a payment method data structure, information about each of a plurality of possible payment methods, the information including one or more attributes, of a transaction, that are suitable for a corresponding possible payment method;

retrieving, from a merchants preferences table, one or more payment method preferences of a merchant identified in the order information;

comparing the one or more attributes for each of the possible payment methods to the order information;

based on the comparing, and based on the one or more payment method preferences, generating a payment intent object containing some, but not all, of the plurality of possible payment methods; and returning the payment intent object to the client device to cause display of the possible payment methods in the payment intent object on the payments page of the graphical user interface.

Example 16. The non-transitory machine-readable medium of Example 15, wherein the one or more attributes each pertain to a location, merchant, product, transaction, or customer.

Example 17. The non-transitory machine-readable medium of Examples 15 or 16, wherein the order information includes a location of a customer and the one or more attributes includes an indication that at least one of the plurality of possible payment methods does not process transactions in a currency associated with the location.

Example 18. The non-transitory machine-readable medium of any of Examples 15-17, wherein the causing display includes returning, to the client device, an instance of the payment intent object with some of the possible payment methods removed.

Example 19. The non-transitory machine-readable medium of Example 18, wherein the payment intent object further includes a client secret.

Example 20. The non-transitory machine-readable medium of any of Examples 15-19, wherein payment via one of the displayed possible payment methods is performed using a payment element containing an iframe that securely sends payment information over a secure Hypertext Transfer Protocol (HTTPs) connection.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a machine but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read- Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2021, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A server system for training and executing machine learning models to dynamically revise, via a document object container, a user interface for presenting request execution methods based on compatibility of available request execution methods, the server system comprising:

at least one hardware processor and non-transitory media storing instructions that, when executed by the at least one hardware processor, cause the at least one hardware processor to perform operations comprising:

generating the document object container, associated with a request type identifier, that is placed on a page of a graphical user interface associated with a computing infrastructure;

in connection with loading the page of the graphical user interface, and before request information provided via the graphical user interface is submitted by the server system to a processing system for processing, retrieving, from a data structure, one or more attributes for each of a plurality of request execution methods;

predicting, using a machine learning model, at least one incompatible request execution method of the plurality of request execution methods a presentation order of the plurality of request execution methods based on comparing the one or more attributes for each of the plurality of request execution methods to the request information; and generating an intent data object containing a subset of the plurality of request execution methods that causes a presentation of the plurality of request execution methods according to the presentation order and excludes the at least one incompatible request execution method, and mounting the intent data object to the document object container with at least one credential associated with the request execution methods on the page of the graphical user interface to cause presentation of the subset of the plurality of request execution methods;

monitoring interactions with the intent data object, via the graphical user interface, comprising selections of a request execution method from the subset of the plurality of request execution methods to execute a request associated with the request type identifier; and retraining the machine learning model using the monitored interactions comprising a threshold number of selections where a selected request execution method is a threshold distance from a first request execution method in the presentation order of the plurality of request execution methods.

2. The server system of claim 1, wherein the one or more attributes each pertain to a location, merchant, product, transaction, or customer.

3. The server system of claim 1, wherein the request information includes a location of a customer and the one or more attributes includes an indication that at least one of the plurality of request execution methods does not process transactions in a currency associated with the location.

4. The server system of claim 1, further comprising:
returning, to a client device, an instance of the intent data object with some of the request execution methods removed.

5. The server system of claim 1, wherein request execution via one of the subset of the plurality of request execution methods is performed using a request execution element containing an iframe that securely sends request execution information over a secure Hypertext Transfer Protocol (HTTPs) connection.

6. The server system of claim 5, wherein the request execution element renders a dynamic form that allows a customer to pick a request execution method from the subset of the plurality of request execution methods.

7. A method comprising:
generating a document object container, associated with a request type identifier, that is placed on a page of a graphical user interface associated with a computing infrastructure;
in connection with loading the page of the graphical user interface, and before request information provided via the graphical user interface is submitted by a server system to a processing system for processing, retrieving, from a data structure, one or more attributes for each of a plurality of request execution methods;
predicting, using a machine learning model, at least one incompatible request execution method of the plurality of request execution methods a presentation order of the plurality of request execution methods based on comparing the one or more attributes for each of the plurality of request execution methods to the request information;
generating an intent data object containing a subset of the plurality of request execution methods that causes a presentation of the plurality of request execution methods according to the presentation order and excludes the at least one incompatible request execution method, and mounting the intent data object to the document object container with at least one credential associated with the request execution methods on the page of the graphical user interface to cause presentation of the subset of the plurality of request execution methods;
monitoring interactions with the intent data object, via the graphical user interface, comprising selections of a request execution method from the subset of the plurality of request execution methods to execute a request associated with the request type identifier; and
retraining the machine learning model using the monitored interactions comprising a threshold number of selections where a selected request execution method is a threshold distance from a first request execution method in the presentation order of the plurality of request execution methods.

8. The method of claim 7, wherein the one or more attributes each pertain to a location, merchant, product, transaction, or customer.

9. The method of claim 7, wherein the request information includes a location of a customer and the one or more attributes includes an indication that at least one of the plurality of request execution methods does not process transactions in a currency associated with the location.

10. The method of claim 7, further comprising:
returning, to a client device, an instance of the intent data object with some of the plurality of request execution methods removed.

11. The method of claim 7, wherein request execution via one of the subset of the plurality of request execution methods is performed using a request execution element containing an iframe that securely sends request execution information over a secure Hypertext Transfer Protocol (HTTPS) connection.

12. The method of claim 11, wherein the request execution element renders a dynamic form that allows a customer to pick a request execution method from the subset of the plurality of request execution methods.

13. A non-transitory machine-readable medium storing instructions which, when executed by one or more processors, cause the one or more processors to perform operations comprising:
generating a document object container, associated with a request type identifier, that is placed on a page of a graphical user interface associated with a computing infrastructure;
in connection with loading the page of the graphical user interface, and before request information provided via the graphical user interface is submitted by a server system to a processing system for processing, retrieving, from a data structure, one or more attributes for each of a plurality of request execution methods;
predicting, using a machine learning model, at least one incompatible request execution method of the plurality of request execution methods a presentation order of the plurality of request execution methods based on comparing the one or more attributes for each of the plurality of request execution methods to the request information;
generating an intent data object containing a subset of the plurality of request execution methods that causes a presentation of the plurality of request execution methods according to the presentation order and excludes the at least one incompatible request execution method, and mounting the intent data object to the document object container with at least one credential associated with the request execution methods on the page of the graphical user interface to cause presentation of the subset of the plurality of request execution methods;
monitoring interactions with the intent data object, via the graphical user interface, comprising selections of a request execution method from the subset of the plurality of request execution methods to execute a request associated with the request type identifier; and
retraining the machine learning model using the monitored interactions comprising a threshold number of selections where a selected request execution method is a threshold distance from a first request execution method in the presentation order of the plurality of request execution methods.

14. The non-transitory machine-readable medium of claim 13, wherein the one or more attributes each pertain to a location, merchant, product, transaction, or customer.

15. The non-transitory machine-readable medium of claim 13, wherein the request information includes a location of a customer and the one or more attributes includes an indication that at least one of the plurality of request execution methods does not process transactions in a currency associated with the location.

16. The non-transitory machine-readable medium of claim 13, further comprising:
returning, to a client device, an instance of the intent data object with some of the plurality of request execution methods removed.

17. The non-transitory machine-readable medium of claim 13, wherein request execution via one of the subset of the plurality of request execution methods is performed using a request execution element containing an iframe that securely sends request execution information over a secure Hypertext Transfer Protocol (HTTPs) connection.

18. The server system of claim 1, wherein retraining the machine learning model comprises adjusting one or more parameters of the machine learning model based on an evaluated loss between predictions of the machine learning model and the monitored interactions.

19. The method of claim 7, wherein retraining the machine learning model comprises adjusting one or more parameters of the machine learning model based on an evaluated loss between predictions of the machine learning model and the monitored interactions.

20. The non-transitory machine-readable medium of claim 13, wherein retraining the machine learning model comprises adjusting one or more parameters of the machine learning model based on an evaluated loss between predictions of the machine learning model and the monitored interactions.

* * * * *